United States Patent

Lemke

[11] Patent Number: 5,921,720
[45] Date of Patent: Jul. 13, 1999

[54] BALL NOSE CUTTING TOOL WITH CENTER MOUNTED TOOL BITS

[76] Inventor: Carl Lemke, 2875 Mapleridge, Highland, Mich. 48356

[21] Appl. No.: 09/012,318

[22] Filed: Jan. 23, 1998

[51] Int. Cl.⁶ ...................................................... B26D 1/12
[52] U.S. Cl. ................................................ 407/42; 407/36
[58] Field of Search .................................. 407/42, 40, 48, 407/61

[56] References Cited

U.S. PATENT DOCUMENTS

| | | |
|---|---|---|
| 3,696,484 | 10/1972 | Spriggs . |
| 4,132,493 | 1/1979 | Hosoi . |
| 4,188,162 | 2/1980 | Zweekly ................................. 407/113 |
| 4,252,480 | 2/1981 | Mizuno et al. . |
| 4,280,774 | 7/1981 | Hayama . |
| 4,300,862 | 11/1981 | Yada . |
| 4,525,110 | 6/1985 | Stojanovski . |
| 4,527,930 | 7/1985 | Harroun ................................... 407/42 |
| 4,564,321 | 1/1986 | Kondo et al. ............................ 407/36 |
| 4,566,827 | 1/1986 | Neumueller ............................. 407/42 |
| 4,699,549 | 10/1987 | Shimomura ............................ 407/113 |
| 4,808,045 | 2/1989 | Tsujimura et al. . |
| 4,838,739 | 6/1989 | Stashko . |
| 4,883,391 | 11/1989 | Tsujimura et al. . |
| 4,898,500 | 2/1990 | Nakamura et al. . |
| 4,927,303 | 5/1990 | Tsujimura et al. . |
| 4,946,318 | 8/1990 | David ...................................... 407/42 |
| 5,190,419 | 3/1993 | Lindberg et al. . |
| 5,542,792 | 8/1996 | Krueger et al. . |
| 5,558,475 | 9/1996 | Hakansson et al. . |
| 5,562,370 | 10/1996 | Vogel et al. . |
| 5,622,460 | 4/1997 | Satran et al. . |

*Primary Examiner*—Andrea L. Pitts
*Assistant Examiner*—Mark Williams
*Attorney, Agent, or Firm*—Gifford, Krass, Groh, Sprinkle, Anderson & Citkowski, P.C.

[57] ABSTRACT

A ball nose cutting tool for mounting within a shank-receiving socket of a powered rotatable spindle. The tool includes an elongate and cylindrical shaped tool holder for insertion within the socket of the spindle and a generally rounded upper end. A plurality of insert receiving cavities are formed within the upper end of the tool and a plurality of insert bits are seatingly engaged within the individual insert cavities via threaded openings which are formed in both planar inner side walls defining the cavities and the seatingly engaging drill bits for receiving a screw fastener. An arcuate and curved cutting edge extends from opposite ends of the planar bottom surface and planar end surface and defines a cutting zone extending from the outer periphery to the center of the tool holder. The cutting edges of the arrayed inserts contact one another at the center of the tool holder in a level fashion so that equal cutting forces are applied during high-speed cutting by the tool and equal wear occurs along each of the cutting edges.

11 Claims, 3 Drawing Sheets

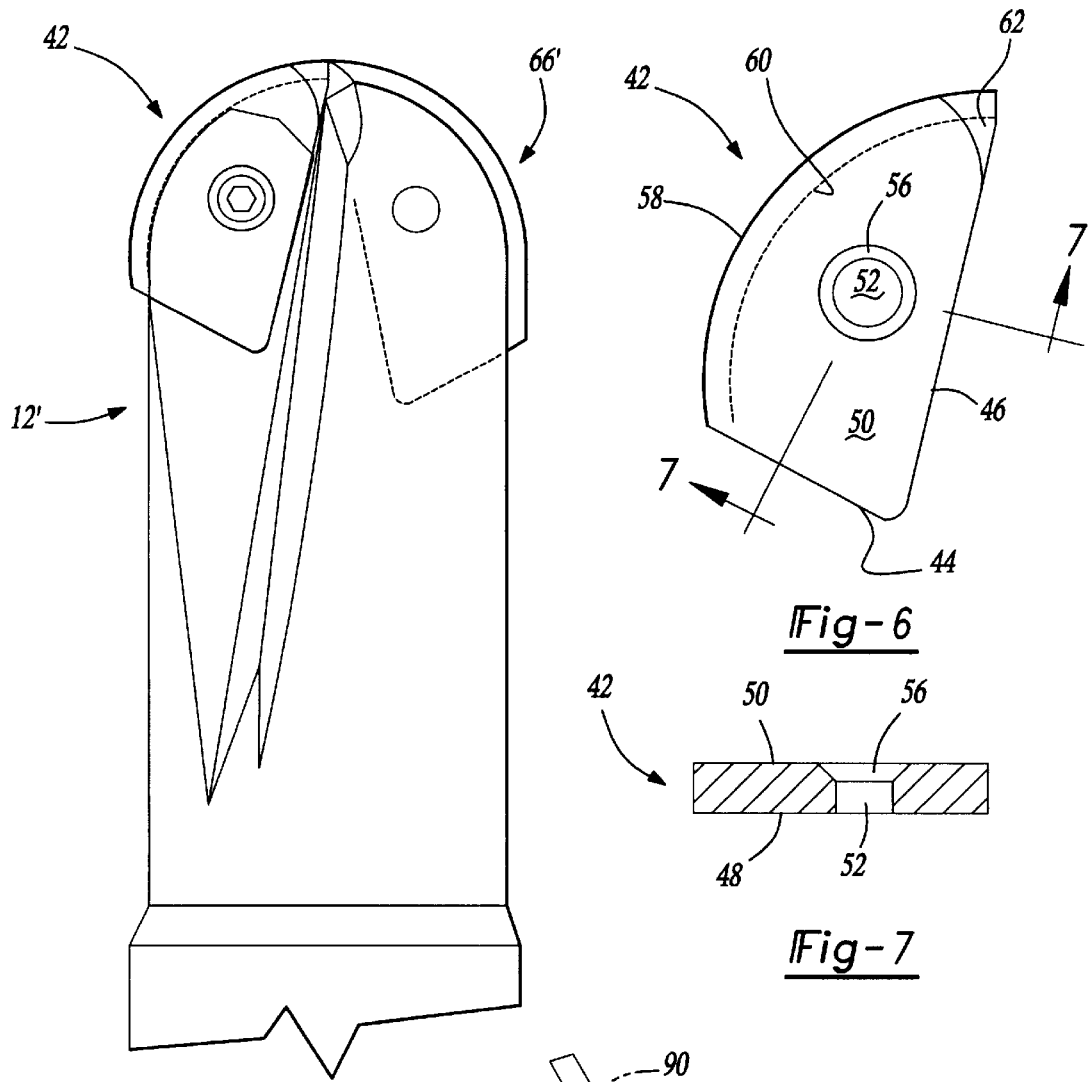
Fig-5
Fig-6
Fig-7
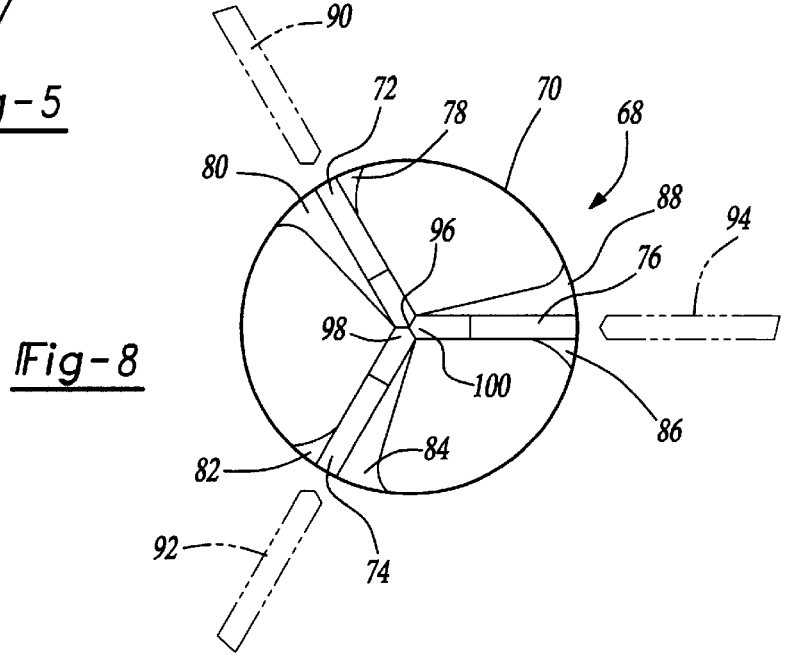
Fig-8

BALL NOSE CUTTING TOOL WITH CENTER MOUNTED TOOL BITS

FIELD OF THE INVENTION

1. Field of the Invention

The present invention relates generally to cutting tools and drills, and more particularly to ball nose end mill tool holders and cutting inserts. The present invention specifically relates to an improved ball nose cutting tool having a uniquely configured tool holder which is capable of receiving in securely mounted fashion a plurality of two or more tool bits, the tool bits each being configured so that they cut within an object to be end milled from the outer periphery of the tool holder to its center location.

2. Description of the Prior Art

Drilling and end milling processes and devices for boring a hole within a workpiece are well known in the art. The objective behind the construction of an appropriate tool for such drilling and end milling processes is to facilitate the machining a smooth bore within such a workpiece and while maintaining the integrity of the tool and its cutting inserts to the extent possible, including attempting to minimize wear evenly along the cutting edge surfaces.

A number of ball nose cutting tools are known in the art for accomplishing the above objectives, an example of which is disclosed in U.S. Pat. No. 4,527,930, issued to Harroun, which teaches such a ball nose cutting tool having a tool holder within which are formed a par of opposed bit-receiving pockets. The pockets are adapted to hold two identical high-speed cutting bits which are configured in an end-to-end relationship such that they cut to the center of the tool holder thereby reducing the cutting forces at the center. The bit-receiving pockets each include dovetailed locator edges, preferably inclined at 45 degrees relative to the bottom walls and end walls, and the cutting bits include 2 complementary machined surfaces for seatingly engaging within the bit-receiving pockets and such that the cutting bits bear against the vertical legs of the dovetailed locator edge surfaces.

Other examples of ball end mill devices are disclosed in U.S. Pat. No. 4,132,493, issued to Hosoi, and U.S. Pat. No. 3,696,484, issued to Spriggs. Hosoi teaches a single-toothed ball end mill provided with a cutting edge defined by a line curved outwardly in the direction of rotation of the end mill and having a greatest curvature at the center portion of the end mill so as to permit the cutting edge to initiate a cutting operation with its starting end and thereafter performing the cutting operation in a progressive and radially outwardly direction.

Spriggs teaches a ball mill cutter with a plurality of three arrayed cutting inserts received in uniformly and circumferentially spaced slots in the tool body. Each of the slots is milled at an angle approximately of 15 degrees to the rotational axis of the tool body. Corresponding back edges and bottom edges of the inserts are flat in cross section and are arrayed at 90 degree relative to one another. Upon being mounted upon the tool holder the various inserts are arrayed such that, at the tip of the tool body, an edge of the bottom wall of each slot desirably intersects the rotational axis of the tool body. The professed advantage of the tool construction of Spriggs is that it permits substantial increase in the feed rate of the cutter along with a minimum of wear along the cutting edges of the inserts.

SUMMARY OF THE PRESENT INVENTION

The present invention is a ball nose cutting tool for mounting within a shank-receiving socket of a powered rotatable spindle. The ball nose cutting tool of the present invention is further an improvement over the prior art cutters described above in that it provides both simplified and improved geometry in both the inserts and insert receiving cavities for establishing the inserts in an outer periphery to center arrangement when mounted to the holder. It is the further objective of the invention that the inserts, when mounted in place upon the tool holder, will not rotate or misalign relative to the tool holder during high speed rotation and cutting and this objective again is accomplished by virtue of both the simplified and improved geometry established between the tool holder insert receiving cavities and inserts.

The cuffing tool includes an elongate and substantially cylindrical shaped tool holder, a base portion of which is adapted to be inserted within the shank-receiving socket of the spindle and the tool holder further having a generally rounded upper end. A plurality of individual insert receiving cavities are formed within the rounded upper end of the tool holder. Each of the cavities includes a planar bottom wall extending at a downward angle relative to a perpendicular line extending through a longitudinal axis of the tool holder and from an outer periphery of the tool holder to an interior middle region of the holder. A planar end wall connects to the planar bottom wall and extends upwardly and inwardly at an acute angle relative to the bottom wall and terminates at a common edge which corresponds with a top center location of the tool holder.

A plurality of insert bits are seatingly engaged within the plurality of individual insert receiving cavities. Each of the insert bits has a specified dimension and thickness and includes a planar bottom surface, a planar end surface, an inner side surface and a spaced apart outer side surface. A second threaded opening extends between the inner side surface and outer side surface of each insert bit such that, upon seating a selected insert within a selected tool holder cavity, the first and second threaded openings align for receiving a screw fastener. An arcuate and curved cutting edge extends from opposite ends of the planar bottom surface and planar end surface of each insert and, upon mounting the insert to the tool holder, defines a cutting zone extending from the outer periphery to the center of the tool holder.

The cutting edges of the arrayed inserts contact one another at the top center of the tool holder in a level fashion so that equal cutting forces are applied during high-speed cutting by the tool and equal wear occurs along each of the cutting edges. In alternate preferred embodiments, either two or three such inserts are arrayed in equally angled and arrayed fashion upon the tool holder. The tool holder further discloses fluted portions formed within the holder at circumferentially spaced apart and longitudinally extending surfaces. The number of fluted portions correspond to the number of inserts employed upon the selected tool holder and the purpose for the fluted portions is to provide an escape channel for shavings resulting from milling of the workpiece.

In further preferred variants, the receiving cavities and inserts may be all of equal dimension or selected cavities and associated inserts may be established according to different sets of dimensions. The planar inner side walls of the insert receiving cavities may further be established at positive or negative rake angles to facilitate mating of contoured and forward locator edges of each of the curved cutting edges of the contacting inserts. The second threaded openings formed between the inner and outer side surfaces of the inserts are also countersunk to receive the enlarged head portion of the conventional screw fastener.

BRIEF DESCRIPTION OF THE DRAWINGS

Reference will now be made to the attached drawings, when read in combination with the following specification, wherein like reference numerals refer to like parts throughout the several views, and in which:

FIG. 5 is a view substantially identical to that illustrated in FIG. 4 with the exception of the first and second insert receiving cavities and insert bits being established according to different dimensions;

FIG. 6 is a partial view of a selected cutting insert according to the present invention;

FIG. 7 is a cutaway view taken along line 7—7 of FIG. 6 and illustrating the countersinking of the second threaded opening as well as the planar configuration of the exterior edge and side surfaces; and FIG. 8 is a top view of an alternate ball nose cutting tool having first, second and third insert receiving cavities for seatingly engaging first, second and third arrayed cutting inserts.

DETAILED DESCRIPTION OF THE PREFERRED EMBODIMENTS

Figure 1:
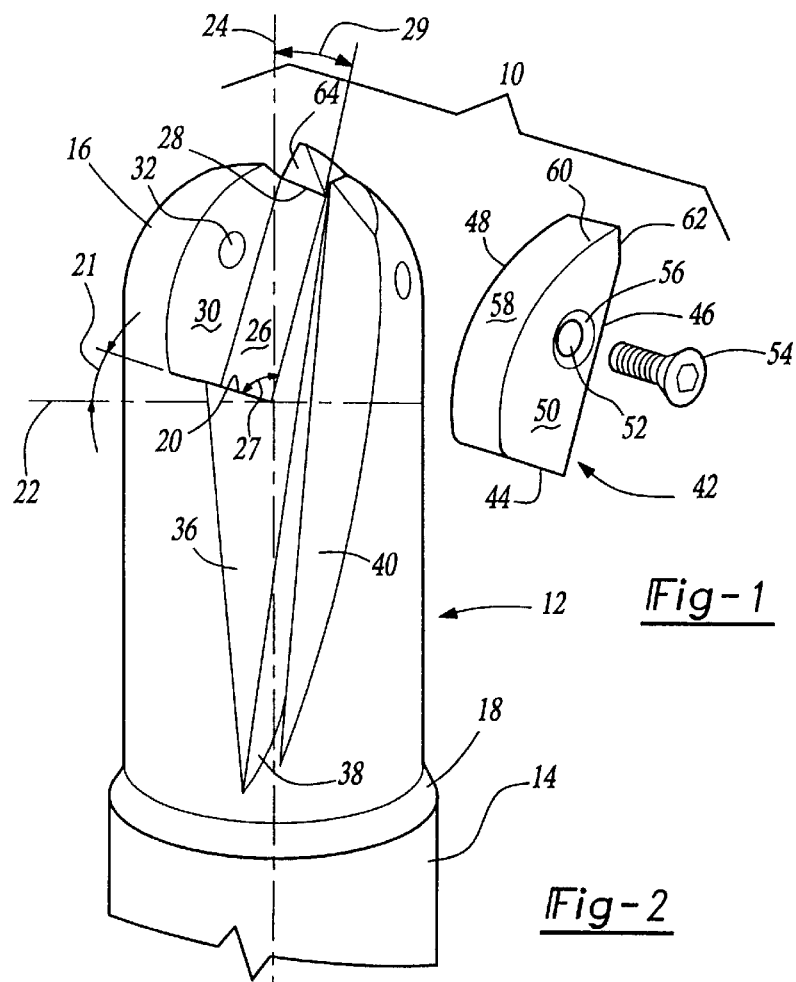
FIG. 1 is a perspective and partially exploded view of the ball nose cutting tool according to a first preferred embodiment of the present invention.

Referring to FIG. 1, a ball nose cutting tool is shown at 10 for mounting within a shank-receiving socket of a powered rotatable spindle. The spindle is not illustrated in the drawings however is of a design and construction known in the art. The tool includes an elongate and substantially cylindrical tool holder 12 including a base portion 14 for insertion within the receiving socket of the spindle and a generally rounded upper end 16. An inward and annular step is also illustrated at 18 for defining an boundary between the base portion 14 and main upper body of the tool holder 12 and is an optional design consideration.

A pair of insert receiving cavities are formed within the rounded upper end 16 of the tool holder 12 and, referring again to FIG. 1, a first of the cavities is clearly illustrated for description herein. Specifically, the insert receiving cavity includes a planar bottom wall 20 extending at a downward angle 21 relative to a perpendicular line 22 extending through a longitudinal axis 24 of the tool holder 12. The downward angle 21 of the bottom wall 20 can vary according to the present invention, but is in any event an acute angle relative to the established perpendicular 22. The bottom wall 20 is further machined as a smooth level surface and does not exhibit any chamfering or dovetailing lines as are found in other prior art tool holder designs.

Figure 2:
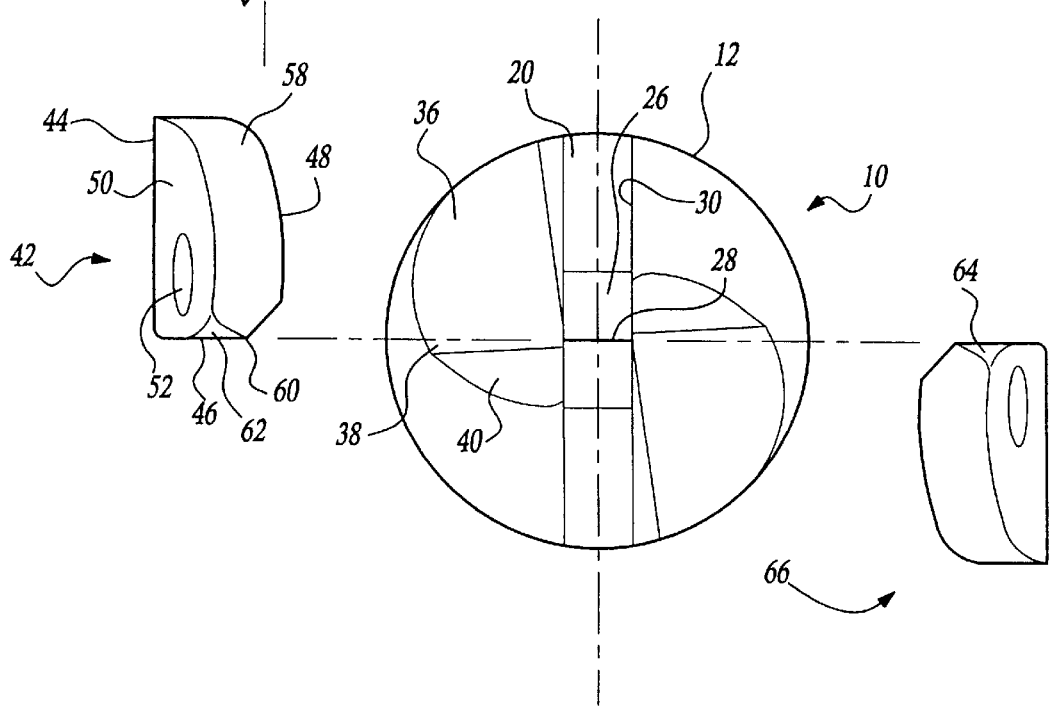
FIG. 2 is a top view of the ball nose cutting tool illustrated in FIG. 1 and further showing first and second inserts in spatially arrayed fashion relative to the tool holder.

A planar end wall 26 connects to the planar bottom wall and extends upwardly and inwardly at an acute angle 27 relative to the bottom wall 20 (as well as at an acute angle 29 relative to the longitudinal axis 24) and terminates at a common edge 28 corresponding to a top center of the tool holder 12. The planar end wall 26 is likewise machined as a smooth level surface vis-a-vis the bottom wall 20 without the need for chamfering or dovetailing lines. A planar inner side wall 30 is provided for the cavity and a first threaded opening 32 is formed within the inner side wall 30. Referring to FIG. 2, and as will be described subsequently in more detail, a rake angle (such as a negative 5 degree angle 34) may be established between the planar inner side wall 30 and the longitudinal axis 24.

Referring again to FIG. 1, fluted portions are formed within the tool holder 12 at circumferentially spaced apart and longitudinally extending surfaces and is illustrated by recessed surfaces 36, 38 and 40 which are formed in subsequent passes by an appropriate cutter tool (not shown) and which cooperate to provide an open side to the insert receiving cavity as well as an escape channel during machining to facilitate removal of chips from the workpiece. As is further evident from the other views, a plurality of such fluted portions is provided along the tool holder for each the associated insert receiving cavities.

A plurality of insert bits are provided for seatingly engaging within the individual insert receiving cavities and, referring again to FIG. 1, such an insert has 42 is illustrated and includes a specified dimension and thickness with a planar bottom surface 44, a planar end surface 46, an inner side surface 48 and a spaced apart outer side surface 50. A second threaded opening 52 extends between the inner side surface 48 and outer side surface 50 and, upon the first and second threaded openings 32 and 52 being aligned through seating engagement of the insert bit 42 within the tool handle 12, permits the installation of a conventional screw fastener 54 to secure the insert 42 to the tool handle 12. The insert bit 42, representative of all the inserts employed in the present invention, is likewise illustrated in FIGS. 6 and 7 and the second threaded opening 52 includes an outwardly flared countersink portion 56, this permitting the enlarged head of the conventional screw fastener 54 to align flush with the outer side surface 50.

Figure 4:
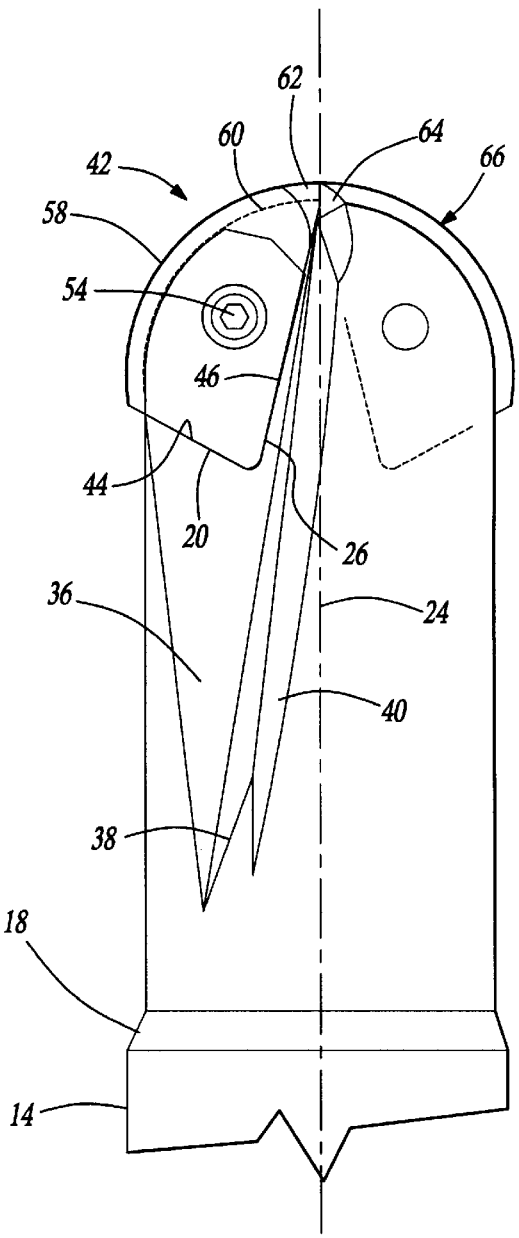
FIG. 4 is a second 90 degree rotated view of the tool holder illustrated in FIG. 3 and further showing the first and second inserts in mating engagement upon the holder.

Viewing FIGS. 1, 2 and 6 in combination, each of the insert bits (and particularly first selected insert bit 42) includes an arcuate and curved cutting edge 58 extending from opposite ends of the planar bottom surface and planar and surface and defining a cutting zone 60 extending from the outer periphery of the tool holder to its top center. The arcuate and curved cutting edges of each of the inset bits further includes a contoured forward locator edge 62 for matingly engaging upon assembly of the cutting inserts onto the tool holder. Referring again to the partially assembly view of FIG. 1, a corresponding forward locator edge 64 is shown for a further insert bit which is mounted to a rear side of the tool holder 12 and largely hidden from view. This insert bit is identified at 66 at the top view of FIG. 2 and the rotated side view of FIG. 4 and includes all of the features of the first insert bit 42 in reverse fashion, therefore a repeat of its structure, as well as that of the corresponding and opposed insert receiving cavity arrayed in opposition to the first cavity described herein, is not necessary for purposes of ease of clarity and presentation.

Figure 3:
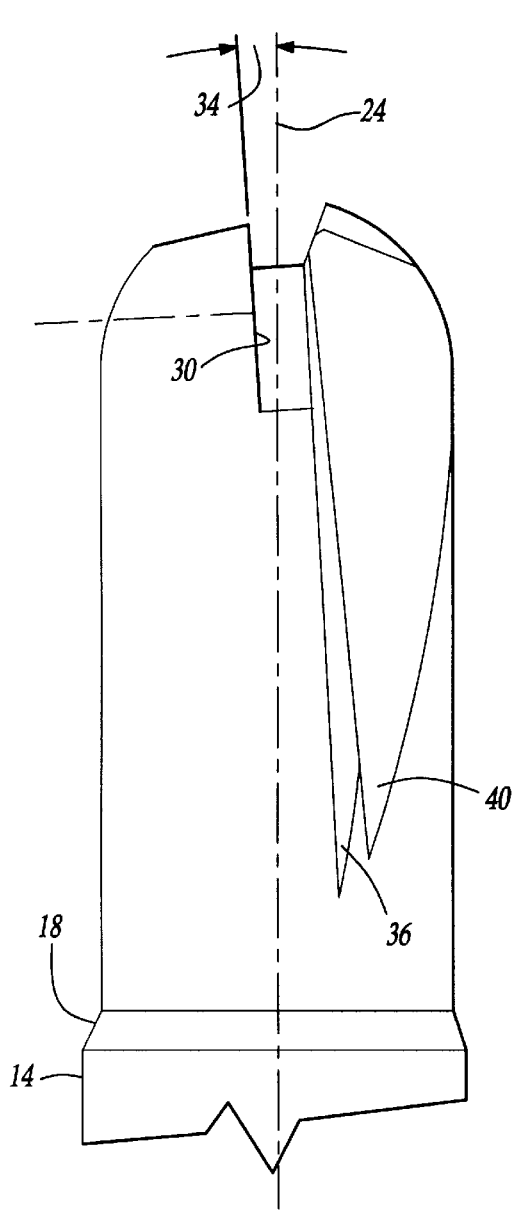
FIG. 3 is a first side view of the tool holder according to the first preferred embodiment of the present invention.

Referring also again to FIG. 3, the rake angle established between the inner side wall of the selected receiving cavity and the longitudinal axis is preferably formulated to correspond with the forming of the contoured forward locator edge to establish optimal mating of the insert cutting edges at the top center of the tool holder. As previously illustrate, such a rake angle can be established at a negative, such as five degrees, however it is also envisioned that a corresponding positive rake angle may be employed within the scope of the present invention.

The first preferred embodiment of the present invention as defined in FIGS. 1–5, illustrates the ball nose cutting tool with a first insert bit 42 and a second insert bit 66 arrayed at 180 degree angular orientation, relative to a top circumferential view of the tool holder such as is provided in FIG. 2, and upon view the tool holder in cross section. Referring to FIG. 8, a further preferred embodiment is illustrated at 68 in which a modified tool holder 70 is machined such that, rather than having two insert receiving cavities as in the first embodiment, a first 72, a second 74 and a third 76 such insert receiving cavity is arrayed at equally angularly arrayed and offset fashion around the circumference of the tool holder's upper end.

The insert receiving cavities 72, 74 and 76 are each machined identical in every respect to that disclosed in the first preferred embodiment and additional fluted portions are partially illustrated in the overhead view, with first portions 78 and 80 corresponding to first cavity 72, second portions 82 and 84 corresponding with second cavity 74 and third portions 86 and 88 corresponding with third cavity 76. A first 90, a second 92 and a third 94 insert bit are illustrated representatively in phantom and are seatingly located and secured to the tool holder so that they are arrayed in 120 degree angular offset as is clearly evident upon viewing FIG. 8. The insert bits 90, 92 and 94 are constructed identical in every regard to those illustrated at 42 and 66 in the first preferred embodiment with the exception of the contour of each of the forward locator edges which matingly engage at the top center of the cutter and which are illustrated in this preferred embodiment at 96, 98 and 100, respectively.

A further variant of the first preferred embodiment is illustrated as 12' in FIG. 5 and contemplates only a second 66' of the cutting inserts (and corresponding insert receiving cavity) being established according to a different set of dimensions than that of the first insert 42 and insert receiving cavity. The purpose of FIG. 5 is to illustrate that the cutting inserts and corresponding insert receiving cavities need not always be identical in dimension and can be machined according to different lengths as desired without deviating from the scope of the present invention.

Having described my invention, it is evident that it discloses an improved ball nose cutting tool in which both the insert receiving cavities in the tool holder and corresponding insert bits are machined in an improved and simplified manner for securing the inserts during high speed rotation such that they will not rotate or misalign relative to the tool holder. The simplified geometry afforded by the present invention is further an advantage over prior art cutting tools which contemplate much more detailed chamfering and dovetailing of the interengaging insert receiving surfaces and inserts for accomplishing the same objectives.

Additional preferred embodiments will become apparent to those skilled in the art to which it pertains without deviating from the scope of the appended claims.

I claim:

1. A ball nose cutting tool for mounting within a shank-receiving socket of a powered rotatably spindle, said cutting tool comprising:

an elongate and substantially cylindrical tool holder, said tool holder including a base portion which is adapted to be inserted within the shank-receiving socket of the spindle, said cylindrical tool holder further including a generally rounded upper end;

a plurality of individual insert receiving cavities formed within said rounded upper end of said tool holder, each of said cavities including a planar bottom wall extending at a downward angle relative to a perpendicular line extending through a longitudinal axis of said tool holder and said perpendicular line extending from an outer periphery of said tool holder to an interior middle region of said holder, a planar end wall connecting to said planar bottom wall and extending upwardly and inwardly at an acute angle relative to said bottom wall and terminating at a common edge which corresponds with a top center of said tool holder, each of said insert receiving cavities further including a planar inner side wall within which is formed a first threaded opening; and a plurality of insert bits for seatingly engaging within said plurality of individual insert receiving cavities, each of said insert bits having a specified dimension and thickness and including a planar bottom surface, a planar end surface, an inner side surface and a spaced apart outer side surface, a second threaded opening extending between said inner side surface and said outer side surface such that, upon seating a selected insert within a selected cavity, said first and second threaded openings align for receiving a screw fastener, an arcuate and curved cutting edge extending from opposite ends of said planar bottom surface and said planar end surface and defining a cutting zone extending from said outer periphery to said center of said tool holder;

said cutting edges of said arrayed inserts contacting one another at said top center of said tool holder in a level fashion so that equal cutting forces are applied during high-speed cutting by said tool and equal wear occurs along each of said cutting edges.

2. The ball nose cutting tool as described in claim 1, further comprising a plurality of fluted portions formed within said tool holder at circumferentially spaced apart and longitudinally extending surfaces.

3. The ball nose cutting tool as described in claim 1, said plurality of insert bits further comprising a first insert bit and a second insert bit arrayed at a 180 degree angular orientation upon viewing said tool holder in cross section.

4. The ball nose cutting tool as described in claim 1, said plurality of insert bits further comprising a first insert bit, a second insert bit and a third insert bit arrayed at 120 degree angular orientation upon viewing said tool holder in cross section.

5. The ball nose cutting tool as described in claim 1, said arcuate and curved cutting edges of each of said insert bits further comprising a contoured forward locator edge for matingly engaging relative to one another.

6. The ball nose cutting tool as described in claim 1, wherein each of said pluralities of insert receiving cavities and insert bits is identically dimensioned.

7. The ball nose cutting tool as described in claim 1, wherein a first selected insert receiving cavity and seatingly engageable insert bit is established according to a first set of dimensions and a second selected insert receiving cavity and seatingly engageable insert bit is established according to a second and different set of dimensions.

8. The ball nose cutting tool as described in claim 1, wherein said second threaded opening of each of said insert bits is countersunk.

9. The ball nose cutting tool as described in claim 1, wherein said planar inner side wall of each of said insert receiving cavities further comprises a rake angle to said longitudinal axis of said tool holder.

10. The ball nose cutting tool as described in claim 9, wherein said rake angle further comprises a five degree negative rake angle.

11. A ball nose cutting tool for mounting within a shank-receiving socket of a powered rotatably spindle, said cutting tool comprising:

an elongate and substantially cylindrical tool holder, said tool holder including a base portion which is adapted to be inserted within the shank-receiving socket of the spindle, said cylindrical tool holder further including a generally rounded upper end;

first and second individual insert receiving cavities formed within said rounded upper end of said tool holder, each of said cavities including a planar bottom wall extending at a downward angle relative to a perpendicular line extending through a longitudinal axis of said tool holder and said perpendicular line extending from an outer periphery of said tool holder to an interior middle region of said holder, a planar end wall connecting to said planar bottom wall and extending upwardly and inwardly at an acute angle relative to said bottom wall and terminating at a common edge which corresponds with a top center of said tool holder, each of said insert receiving cavities further including a planar inner side wall within which is formed a first threaded opening;

first and second insert bits for seatingly engaging within said first and second individual insert receiving cavities, each of said insert bits having a specified dimension and thickness and including a planar bottom surface, a planar end surface, an inner side surface and a spaced apart outer side surface, a second threaded opening extending between said inner side surface and said outer side surface such that, upon seating a selected insert within a selected cavity, said first and second threaded openings align for receiving a screw fastener, an arcuate and curved cutting edge extending from opposite ends of said planar bottom surface and said planar end surface and defining a cutting zone extending from said outer periphery to said center of said tool holder; and a plurality of fluted portions formed within said tool holder at circumferentially spaced apart and longitudinally extending surfaces extending along said tool holder, said fluted portions cooperating to provide an open side for each of said inset receiving cavities as well as an escape channel during machining to facilitate removal of machined chips from a workpiece;

said cutting edges of said arrayed inserts contacting one another at said top center of said tool holder in a level fashion so that equal cutting forces are applied during high-speed cutting by said tool and equal wear occurs along each of said cutting edges.

* * * * *

UNITED STATES PATENT AND TRADEMARK OFFICE
CERTIFICATE OF CORRECTION

PATENT NO. : 5,921,720
DATED : July 13, 1999
INVENTOR(S) : Carl Lemke

It is certified that error appears in the above-identified patent and that said Letters Patent is hereby corrected as shown below:

Column 1, line 19 - Delete the word "the".
Column 1, line 20 - Delete "and" (first occurrence).
Column 1, line 28 - Replace "par" with "pair".
Column 1, line 53 - Insert --of-- after "angle".
Column 1, line 53 - Delete "of" after the word "approximately".
Column 1, line 56 - Replace "degree" with "degrees".
Column 3, line 40 - Insert --it-- after "however".
Column 4, line 16 - Insert --of-- after "each".
Column 4, line 20 - Replace "has" with "bit".
Column 4, line 40 - After the word "planar", delete "and" and insert --end--.
Column 5, line 4  - Replace "view" with "viewing".

Signed and Sealed this

Fifth Day of September, 2000

*Attest:*

Q. TODD DICKINSON

*Attesting Officer*  *Director of Patents and Trademarks*